(12) United States Patent
Nepper et al.

(10) Patent No.: US 9,390,193 B2
(45) Date of Patent: Jul. 12, 2016

(54) DELAY THE PERSISTENT MEMORY STORAGE OF WEBSITE DATA TO CONTROL DATA THAT IS STORED IN THE BROWSER

(75) Inventors: Patrick Louis Maurice Nepper, Rosenheim (DE); Jochen Mathias Eisinger, Munich (DE); Wieland Holfelder, Planegg (DE)

(73) Assignee: GOOGLE INC., Mountain View, CA (US)

( * ) Notice: Subject to any disclaimer, the term of this patent is extended or adjusted under 35 U.S.C. 154(b) by 270 days.

(21) Appl. No.: 13/550,215

(22) Filed: Jul. 16, 2012

(65) Prior Publication Data

US 2014/0019518 A1 Jan. 16, 2014

(51) Int. Cl.
| | |
|---|---|
| *G06F 15/16* | (2006.01) |
| *G06F 17/30* | (2006.01) |
| *H04L 29/08* | (2006.01) |
| *H04L 29/06* | (2006.01) |
| *G06F 17/00* | (2006.01) |

(52) U.S. Cl.
CPC .......... *G06F 17/30902* (2013.01); *G06F 17/00* (2013.01); *G06F 17/30* (2013.01); *G06F 17/30905* (2013.01); *H04L 63/10* (2013.01); *H04L 63/20* (2013.01); *H04L 67/02* (2013.01)

(58) Field of Classification Search
None
See application file for complete search history.

(56) References Cited

U.S. PATENT DOCUMENTS 6,851,060 B1 * 2/2005 Shrader ........................ 726/10
6,928,440 B2 8/2005 Cordray et al.
(Continued)

FOREIGN PATENT DOCUMENTS

WO WO 01/50299 A2 7/2001

OTHER PUBLICATIONS

International Search Report directed to related International Patent Application No. PCT/US2013/050176, mailed Dec. 6, 2013; 3 pages.
(Continued)

*Primary Examiner* — Chris Parry
*Assistant Examiner* — Caroline Jahnige
(74) *Attorney, Agent, or Firm* — McDermott Will & Emery LLP

(57) ABSTRACT

Embodiments of the invention include a system, computer-implemented method, and a computer-readable medium for delaying the storage of data. Data that manipulates website data is provided from a web server to a client device in response to a request for a webpage. Data is initially stored in a temporary memory storage. The temporary memory storage is associated with a browser and stores data before data is moved to a persistent memory storage. A notification is generated that indicates that data was received and is intended to be stored persistently or manipulate, access or rely on website data in the persistent memory storage. Depending on the response to the notification, the system determines how data in temporary memory storage will be processed and whether data can be stored in the persistent memory storage or manipulate, access and rely on website data in the persistent memory storage.

20 Claims, 5 Drawing Sheets

(56) References Cited

U.S. PATENT DOCUMENTS

| | | | |
|---|---|---|---|
| 7,877,800 B1* | 1/2011 | Satish et al. | 726/22 |
| 8,041,778 B2 | 10/2011 | Krabach et al. | |
| 2002/0156781 A1* | 10/2002 | Cordray et al. | 707/9 |
| 2003/0131045 A1* | 7/2003 | McGee et al. | 709/201 |
| 2005/0216844 A1 | 9/2005 | Error et al. | |
| 2005/0257250 A1* | 11/2005 | Mitchell et al. | 726/3 |
| 2011/0022571 A1 | 1/2011 | Snyder | |
| 2011/0166932 A1* | 7/2011 | Smith et al. | 705/14.53 |
| 2012/0240050 A1* | 9/2012 | Goldfeder et al. | 715/745 |
| 2012/0275310 A1* | 11/2012 | Watfa | H04W 8/082 370/238 |

OTHER PUBLICATIONS

International Preliminary Report on Patentability directed to related International Patent Application No. PCT/US2013/050176, Geneva, Switzerland, mailed Jan. 20, 2015; 1 page.

Written Opinion of the Searching Authority directed to related International Patent Application No. PCT/US2013/050176, Munich, Germany, mailed Dec. 6, 2013; 4 pages.

* cited by examiner

300

Cookie or Website Data Information 302

Name: SessionID
Content: Acz1FsCXT7NO-fuNs
Domain: .MyWebsite.com
Path: /
Send For: Any kind of connection
Accessible to Script: No (HttpOnly)
Created: Wednesday, June 1, 2011 10:30:08 AM
Expires: Saturday, May 29, 2021 10:30:08 AM

FIG. 3

DELAY THE PERSISTENT MEMORY STORAGE OF WEBSITE DATA TO CONTROL DATA THAT IS STORED IN THE BROWSER

BACKGROUND

As users browse websites accessible via the Internet or the World Wide Web (or simply the "Web"), they download content from web resources onto their computing devices. This downloaded content may include cookie and website data. Typically, cookie and website data are stored in a persistent storage of a computing device that is associated with a browser.

To prevent the storage of unwanted cookie and website data, a conventional browser allows a user to configure a set of rules. However, those rules may disrupt the user experience by preventing webpages and other data content from being downloaded to the computing device. In other instances, the user may not know whether to allow or block the cookie or website data from being persistently stored on the computing device. Thus, what is needed is a way to store cookie and website data temporarily on the computing device until a user makes a decision to persistently store the received cookie or website data, or alternatively, a user configures the computing device to remove the cookie or website data from the temporary storage location.

BRIEF SUMMARY

Embodiments of the invention include a system, computer-implemented method, and a computer-readable medium for delaying the storage of data. Data from a web server is provided to a client device in response to a request for a webpage. Data is initially stored in a temporary memory storage. The temporary memory storage is associated with a browser and stores data before data is moved to a persistent memory storage. A notification is generated that indicates that data was received and is intended to be stored persistently. Depending on the response to the notification, the system determines how data in temporary memory storage will be processed and whether data can be stored in the persistent memory storage.

Further embodiments, features, and advantages of the invention, as well as the structure and operation of the various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

FIG. 3 is a screenshot of an exemplary embodiment of a displayed cookie or website data information.

Figure 1:
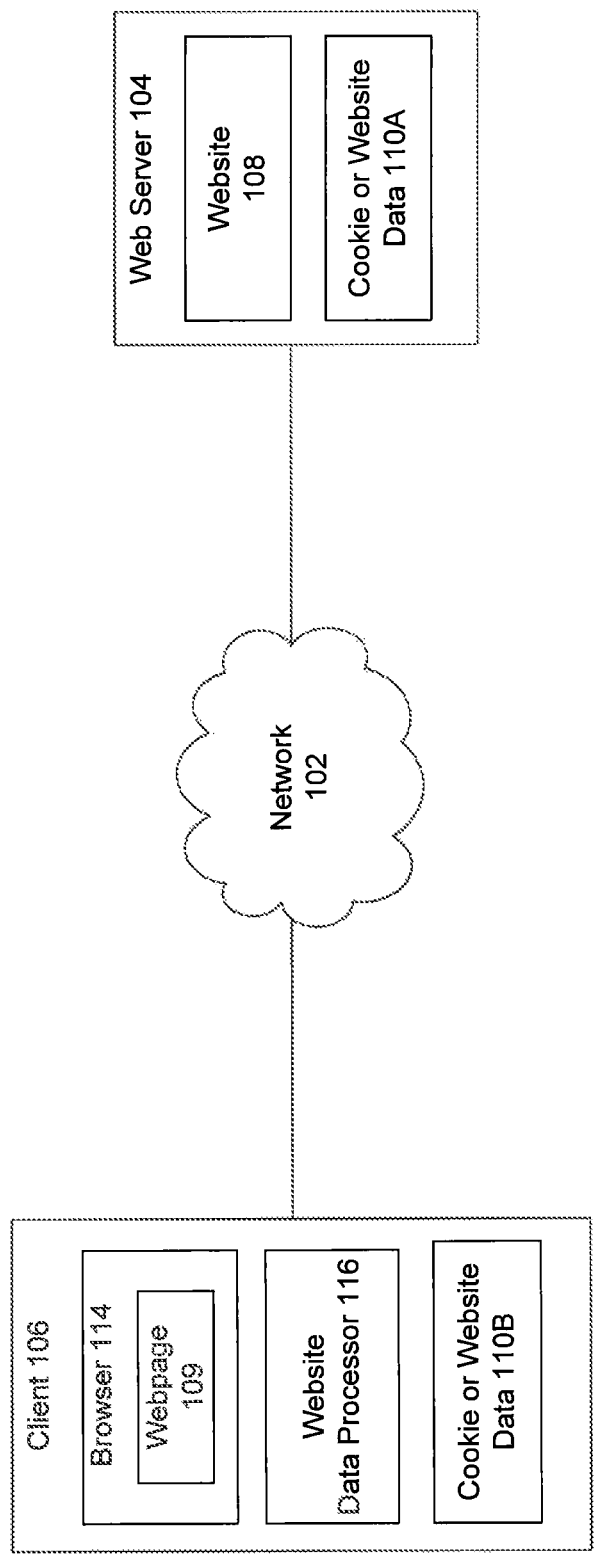
FIG. 1 is a block diagram showing a client-server system in which embodiments of the invention can be implemented.

Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

System

FIG. 1 is a block diagram of a client-server environment 100. Client-server environment 100 includes one or more networks 102, web servers 104, and clients 106.

Network 102 may be any network or combination of networks that can carry data communication. Such a network 102 may include, but is not limited to, a local area network, metropolitan area network, and/or wide area network together forming the Internet. Network 102 can support technologies, including, but not limited to, the World Wide Web (or simply the "Web"), that provide access to services and applications using protocols, such as a HyperText Transfer Protocol ("HTTP"). Intermediate web servers, gateways, or other servers may be provided between components of the system shown in FIG. 1, depending upon a particular application or environment.

Web server 104 is a computing device or an application executing on a computing device that hosts multiple websites 108. A website 108 is a set of related webpages containing content such as text, video, music, audio, and images, to name only a few. Website 108 is accessible via network 102 through a website address, such as a Uniform Resource Locator ("URL").

Webpage 109 is a document that is written in plain text and which is interspersed with formatting instructions. Those formatting instructions may be in a HyperText Markup Language ("HTML"), eXtensible HyperText Markup Language ("XHTML"), Multipurpose Internet Mail Extensions ("MIME") HTML (also referred to as "MHTML"), Scalable Vector Graphics ("SVG"), or flash objects to name a few examples. Webpage 109 may also incorporate content from multiple websites 108.

Multiple web servers 104 may be combined in a domain. A domain comprises multiple web servers 104 that can receive and process a request message, such as an HTTP request message, for a particular webpage 109 and transmit the particular webpage 109 to client 106.

Client 106 is an electronic computing device that is manipulated by a user and is capable of requesting and receiving website 108 resources over network 102. Example clients 106 are personal computers, mobile communication devices, and tablet computers. Client 106 typically includes an application, such as a web browser (or simply "browser") 114. Browser 114 may appear as a standalone application or may be embedded in another application. A user uses browser 114 to request and receive webpages 109 over network 102. For example, a user requests webpage 109 by typing the website address, such as a URL, associated with webpage 109. When browser 114 receives a URL address from a user, browser 114 generates a request message and transmits the request message to website 108 associated with the URL.

In response to the request message, web server 104 transmits a response message to client 106. The response message includes webpage 109. The response message can also include cookies (also referred to as "HTTP cookies", "web cookies" or "browser cookies"), values for website data or instructions that manipulate website data, or both (collectively referred to as cookie or website data 110.) Website data may be data that is stored on web server 104 that may, for example, update, delete and manipulate data on processes and web based applications that are executing on client 106. In one embodiment, those processes or web based applications may be installed on client 106, or included as plug-ins to browser 114. Example processes and web based applications may include web data for document object model ("DOM") storage, web databases, indexed databases, application caches and file systems on client 106, to name only a few. In FIG. 1, values for website data or instructions that manipulate website data are stored on web server 104 and referred to as cookie or website data 110A.

In an embodiment, website data may also be stored on client 106. Website data stored on client 106 may be all or a subset of website data stored on web server 104 that was previously downloaded to client 106. In this embodiment, website data on client 106 may be updated with values for website data from web server 104, as described below. Web server 104 may also request values stored in website data from client 106. In another embodiment, website data may be generated on client 106. Example website data may be included in DOM storage on client 106, web databases, indexed databases (also referred to as indexed DB for storing large amounts of structured data on client 106), application cache and file system on client 106. Once website data is stored on client 106, client 106 may receive instructions that manipulate the website data. In one embodiment, those instructions may be received from web server 104 in JavaScript or another language. In FIG. 1, website data that is stored on client 106 is referred to as cookie or website data 110B.

The script in Tables 1A-1B below, includes instructions that manipulate website data on client 106. In Table 1A, browser 114 on client 106 may send a HTTP request to web server 104.

TABLE 1A

GET /test.html http/1.1
Host: example.com

In response to the HTTP request, web server 104 sends the HTML document such as the HTML document included Table 1B to client 106, below.

TABLE 1B

```
<!DOCTYPE html>
<html>
<head>
<script>
Onload = function ( ) {
if ("visited" in localStorage)
        document.body.innerText = "Welcome back!";
else
        document.body.innerText = "Hello, Stranger!";
        localStorage["visited"] = 1;
}
</script>
</head>
<body>
</body>
</html>
```

In Table 1B, the variable "visited" is website data that is stored on client 106. As demonstrated in Table 1B, the value of variable "visited" is not transmitted over network 102 but is stored in memory storage on client 106. Example memory storage is discussed in detail in FIG. 5. The instructions in the HTML document in Table 1B, however, manipulate the value "visited" in website data when the instructions set the value of "visited" to "1".

As shown in Tables 1A-1B, a variable that is website data (for example variable "visited") is not transmitted over network 102. Rather instructions that access the variable and set the value to the variable are transmitted. When client 106 receives the HTML document, the value is set to a variable once the website data is accessed in a manner described below.

In another embodiment, Table 1C includes a script in the HTML document that accesses website data in a web database. The HTML document in Table 1C may be generated and sent to client 106 in response to the HTTP request in Table 1A.

TABLE 1C

```
<!DOCTYPE html>
<html>
<head>
<script>
var db = openDatabase("VisitorDB", "1.0", "IDF Example", 200000);
db.transaction(function(tx) {
        tx.executeSql("SELECT * FROM visited", [ ], function (result) {
            document.body.innerText = "Welcome back!";
        }, function (tx, error) {
            tx.executeSql("CREATE TABLE visited (timestamp REAL)", [ ], function (result) {
                tx.executeSql("INSERT INTO visited (timestamp) VALUES (?)", [new Date( ).getTime( )]);
                document.body.innerText = "Hello, Stranger!";
            });
        });
});
</script>
</head>
<body>
</body>
</html>
```

As with example in Table B, the script includes instructions that access and manipulate website data in the web database, but not the actual website data. For example, in Table 1C values from table "visited" are selected and analyzed. Based on the values from the table visited, variable "document.body.innerText" is set to either "Welcome back!" or "Hello, Stranger!".

In yet another example, the website data may be manipulated using an indexed database. Table 1D below includes a script in the HTML document that accesses an indexed database. The HTML document in Table 1D may be generated in response to the HTTP request in Table 1A.

TABLE 1D

```
<!DOCTYPE html>
<html>
<head>
<script>
var req = webkitIndexedDB.open("visited");
req.onsuccess = function(e) {
  var db = e.target.result;
  var ver = "1.0";
  if (ver != db.version) {
    var vtx = db.setVersion(ver);
    vtx.onsuccess = function( ) {
      db.createObjectStore("visited", {keyPath: "timeStamp"});
      var tx = db.transaction(["visited"],
```

TABLE 1D-continued

```
      webkitIDBTransaction.READ_WRITE);
      var store = tx.objectStore("visited");
      store.put({"timeStamp": new Date( ).getTime( )});
      document.body.innerText = "Hello, Stranger!";
    }
  } else {
    document.body.innerText = "Welcome back!";
  }
}
</script>
</head>
<body>
</body>
</html>
```

As with examples in Tables B and C, the script includes instructions that access and manipulate website data in the indexed database, but not the actual website data.

Cookies provide information available on client 106 to web server 104. For example, a person skilled in the art will appreciate that the HTTP protocol used to transmit webpage 109 between web server 104 and client 106 is a stateless protocol. As a result, when browser 114 makes two separate requests to web server 104, web server 104 cannot identify that the two requests were made by the same browser 114. When browser 114 includes cookies in the request, cookies allow web server 104 to process the request based on the information provided in the cookies. For example, web server 104 may generate webpage 109 based, at least in part, on the information provided by the cookies.

Tables 1A and 1E-1G demonstrate an example communication between web server 104 and client 106 that includes cookies. For example, in response to a first HTTP request to web server 104 in Table 1A, web server 104 may transmit a HTTP response that includes a cookie in the script included in Table 1E, below.

TABLE 1E

```
HTTP/1.0 200 OK
Content-Type: text/html
Content-Length: 21
Set-Cookie: visited=1
<p>Hello, Stranger!
```

In the HTTP response in Table 1E, web server 104 transmits a cookie to client 106 that has a value for variable "visited" set to 1. When client 106 receives the HTTP response in Table 1E, it stores the cookie in a memory storage (described in detail in FIG. 5.) Subsequently, when client 106 sends a subsequent HTTP request to the host "example.com" on web server 104, the HTTP request includes the cookie in Table 1E whose value of the variable "visited" is set to 1. The example subsequent HTTP request is included in Table 1F below.

TABLE 1F

```
GET /test.html http/1.1
Host: example.com
Cookie: visited=1
```

In response to the HTTP request in Table 1F, web server 104, may send an HTTP response in Table 1G. The response in Table 1G indicates that web server 104 has identified that it has previously transmitted a cookie to client 106, and has included information in the HTTP response based, at least in part, on the state of the cookie stored on client 106.

TABLE 1G

```
HTTP/1.0 200 OK
Content-Type: text/html
Content-Length: 18
Set-Cookie: visited=1
<p>Welcome back!
```

As shown in Tables 1E-1G, the cookie that includes a variable set to a particular value is transmitted over network 102.

Cookies are generated and stored on web server 104. In FIG. 1, cookies that are stored on web server 104 are referred to as cookie and website data 110A. In an embodiment, cookies are included in a response message, such as an HTTP message from web server 104. When downloaded to client 106, cookies may be stored in a memory accessible to browser 114. Example memory is described in detail in FIG. 5. Similarly, when client 106 subsequently sends a request message to web server 104, cookies may also be included in the header of the request message. In FIG. 1, cookies that are stored on client 106 are referred to as cookie or website data 110B.

Cookies are tokens that include name-value pairs. As a user uses browser 114 to access webpages 109, the names in cookies may be populated with a particular value. For example, the value of a cookie may be populated with a user identifier. The user identifier is specific to a cookie that is stored on a particular client 106. When web server 104 receives a cookie with a user identifier, the user identifier may be mapped to the user identifier on web server 104 that stores user information. In an online store website, for example, a user identifier may map to a list of items (i.e. a virtual "shopping cart") that a user selected through an online store.

In addition to the name-value pairs that store state information, a cookie includes multiple attributes. For example, a cookie may include a domain attribute and a path attribute. The domain attribute identifies the domain that is associated with a cookie. For example, browser 114 may include a cookie in a request message to web server 104 that is located in a domain stored in the cookie. The path attribute further limits the web address on web server 104 to which client 106 may transmit a request that includes the cookie. The cookie attributes may also include cookie creation and expiration dates.

When a conventional browser receives cookie or website data from a web server, a conventional browser stores cookie or website data in the persistent memory. A conventional browser also allows for deletion of cookie or website data. For example, a user may delete cookies from the persistent storage associated with a browser. If cookies are not blocked, those cookies, however, may already be stored in persistent storage and may provide the browsing habits of the user to one or more web servers until they are blocked or removed. In another example, a user may use a browser to create, delete and modify a set of rules that control access of cookies to the client. For example, a user may set up a rule that allows a browser to store cookies from website www.example.com, but not from website www.example.org. In another example, a user may configure a rule to notify the user when a browser receives a particular cookie, and allow a user to accept or block the cookie. In another example, a user may set up a rule that blocks some or all cookies from being stored on the client.

A person skilled in the art will appreciate that blocking some cookie or website data from being stored on a client may be preferred by some users. For example, a cookie stored on a client may track the browsing activities of the user. When a user does not wish to have his browsing activities tracked by a particular cookie, a user may set up a rule to block or remove that cookie.

However, in those conventional systems, a user does not have an option of viewing the cookie information or website data information before they are stored. In an embodiment, additional information about a cookie or about website data would allow a user to determine which cookie or website data should be blocked or which cookie or website data may be stored persistently on a client.

To provide a user with an option for viewing cookie or website data information, and determine whether to accept or reject cookie or website data 110, browser 114 delays the persistent storage of cookie or website data 110 on client 106. As described in detail in FIG. 2, when browser 114 receives cookie or website data 110 from web server 104, browser 114 stores cookie or website data 110 in a temporary memory storage. This provides a user with an opportunity to review cookie or website data information prior to storing cookie or website data in the persistent memory storage.

Figure 2:
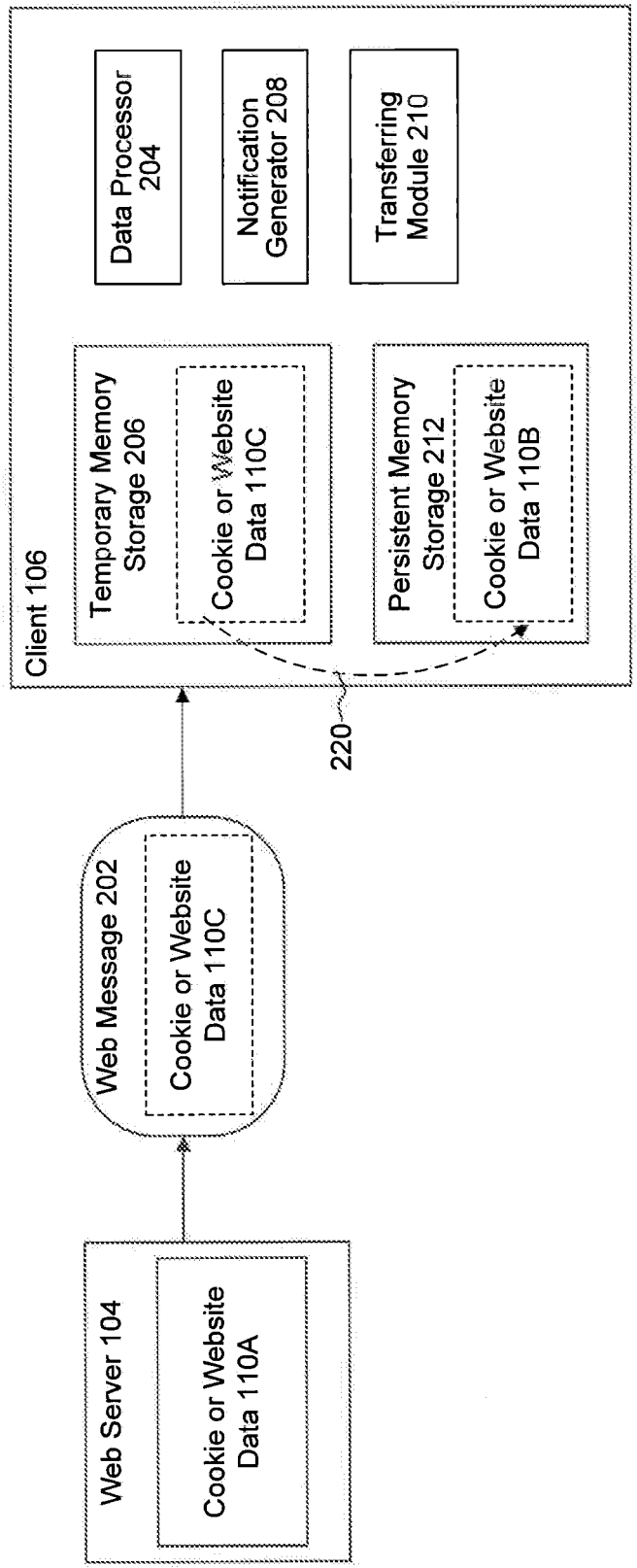
FIG. 2 is a block diagram of an exemplary system for delaying storage of cookie and website data in a persistent memory storage on a client.

FIG. 2 is a block diagram of an exemplary system 200 for delaying storage of cookie or website data in a persistent memory storage of a client. In FIG. 2, web server 104 stores cookie or website data 110A. Upon a request from client 106 (not shown), web server 104 generates web message 202. Web message 202 includes cookie or website data 110C. Cookie or website data 110C may be a subset of cookies that are stored on web server 105 or instructions, variables, etc., that access, rely on and/or manipulate website data on client 106. In another embodiment, cookie or website data 110C may be included in the header of web message. Example web message 202 may be an HTML message. Once generated, web server 104 transmits web message 202 to client 106. Example cookie or website data 110C is shown in Tables 1B-1G.

When browser 114 receives web message 202, browser 114 passes web message 202 to data processor 204. Data processor 204 stores cookie or website data 110C included in web message 202 in temporary memory storage 206. Temporary memory storage 206 may be a volatile memory storage (described in detail in FIG. 5). Temporary memory storage 206 may, for example, require a power supply to maintain a memory state. Example temporary memory storage 206 may include a random access memory ("RAM"), dynamic random access memory ("DRAM") and static random access memory ("SRAM"). Typically, client 106 stores data temporarily in temporary memory storage 206, such as data that client 106 intends to delete, move to persistent memory storage or that may be deleted when client 106 is turned off. In an embodiment, cookie or website data 110C may be stored in temporary memory storage 206 until client 106 receives instructions to accept, block and/or remove cookie or website data 110C.

Once data processor 204 stores cookie or website data 110C in temporary memory storage 206, data processor 204 invokes notification generator 208. Notification generator 208 notifies browser 114 that cookie or website data 110C is stored in temporary memory storage 206. In one embodiment, notification generator 208 generates a notification message for browser 114. When browser 114 receives the notification message, browser 114 may use the notification message to notify the user that cookie or website data 110C is stored in temporary memory storage 206. The notification message may include a message that is displayed on the display screen of client 106 or be in an audio, to name a few examples.

In one embodiment, when browser 114 notifies a user that browser 114 received cookie or website data 110C, a user provides an indication to accept or block cookie or website data 110C. In another embodiment, a user may also use client 106 to create rules that accept or block subsequent instances of cookie or website data 110C that client 106 receives from web server 104.

In one embodiment, to make an informed decision to accept or block cookie or website data 110C, a user is provided with cookie or website data information on a display screen. The display screen presents a user with the cookie or website data information in a detailed format. Based on the presented information, a user provides an indication to accept or reject cookie or website data 110C. Example website data information that data processor 204 presents to a user is described in detail in FIG. 3.

Once a user decides to accept or reject cookie or website data 110C, data processor 204 activates transferring module 210. When client 106 receives an indication from a user to accept cookie or website data 110C, transferring module 210 transfers cookie or website data 110C from temporary memory storage 206 to persistent memory storage 212, as indicated by arrow 220. Once in persistent memory storage 212, cookie or website data 110C may update, delete or append cookie or website data 110B that is persistently stored on client 106.

When client 106 receives an indication from a user to reject or block cookie or website data 110C, transferring module 210 removes cookie or website data 110C from temporary memory storage 206 or any other storage on client 106 (not shown). In an embodiment, transferring module 210 may remove all cookie or website data 110C that is associated with the origin of data, such as a domain. Additionally, client 106 may receive an indication from a user that causes data processor 204 to block cookie or website data 110C from being stored in temporary memory storage 206 when browser 114 subsequently receives other instances of the blocked cookie or website data 110C from web server 104. In another embodiment, a user may use browser 114 to configure one or more rules to block cookie or website data 110C.

Persistent memory storage 212 stores persistent data, such as cookie or website data 110B. Persistent data may persist in persistent memory storage 212 after client 106 is shut down. Typically, persistent memory storage 212 is a non-volatile storage (described in detail in FIG. 5), such as a hard drive or flash memory.

In an embodiment, when a user fails to respond to the notification message, website data 110C is processed according to the default settings. Default settings provide data processor 204 with instructions for processing cookie or website data 110C. Default settings may also include rules that a user had previously configured for processing cookie or website data 110C. In an embodiment, those rules may be specific to processing cookie or website data 110C from a particular web server 104, a particular application, or a particular type of cookie or website data 110C.

For example, transferring module 210 may access default settings included in browser 114 and determine whether to transfer cookie or website data 110C from temporary memory storage 206 to persistent memory storage 212. Transferring module 210 may also use user settings to remove cookie or website data 110C from temporary memory storage 206, or any other storage on client 106. Transferring module 210 may also use user settings to block cookie or website data 110C from being stored in temporary memory storage 206 when browser 114 receives cookie or website data 110C from web server 104.

In an embodiment, browser 114 may be configured to wait for a configurable amount of time prior to determining that a user failed to respond to a notification message. For example, browser 114 may be configured to wait for time "t" for an indication from a user to view information associated with cookie or website data 110C. In an embodiment, time "t" may be an integer that indicates the amount of time in, for example, seconds, after a notification message was issued on client 106. If browser 114 receives an indication from a user to view cookie or website data information within time "t", browser 114 displays cookie or website data information on a display screen. Otherwise, browser 114 activates transferring module 210 that uses the default settings for processing website data 110C as described above.

In another embodiment, web message 202 may include instructions, such as JavaScript instructions (not shown) that access or manipulate website data 110B that is stored in persistent memory storage 212. In this embodiment, data processor 204 invokes notification generator 208 when data processor 204 determines that instructions attempt to access and manipulate website data 110B. The instructions may attempt to access website data 110B upon a receipt of web message 202 or at another time. Once invoked, notification generator 208 generates a notification message for browser 114 that includes a message on the display screen, as described above. When a determination is made that the website data 110B may be manipulated by the received instructions, data processor 204 processes the instructions that are received in web message 202. As described above, the determination may be based on an indication from a user or may be stored in the user settings. For example, a user may provide an indication to process or block the instructions associated with a particular website or a domain. Alternatively, when a determination is made that website data 110B cannot be accessed by the received instructions, data processor 204 does not process instructions included in web message 202.

FIG. 3 is a screenshot 300 of an exemplary embodiment of cookie or website data information that is displayed on a client. The cookie or website data information referred to as website data information 302 in FIG. 3 enables a user to decide whether to accept or reject cookie or website data 110C. A person skilled in the art will appreciate that FIG. 3 is exemplary, and the invention is not limited to this embodiment.

Website data information 302 may include attributes such as the domain that generated cookie or website data 110C (when website data is generated on server 104), the name associated with cookie or website data 110C, and the time cookie or website data 110C was created, to name a few examples. Based on website data information 302, a user is able to determine whether to accept or block website data 110C. When a user accepts cookie or website data 110C, transferring module 210 transfers cookie or website data 110C from temporary memory storage 206 to persistent memory storage 212. Otherwise, transferring module 210 deletes cookie or website data 110C from temporary memory storage 206.

Method

Figure 4:
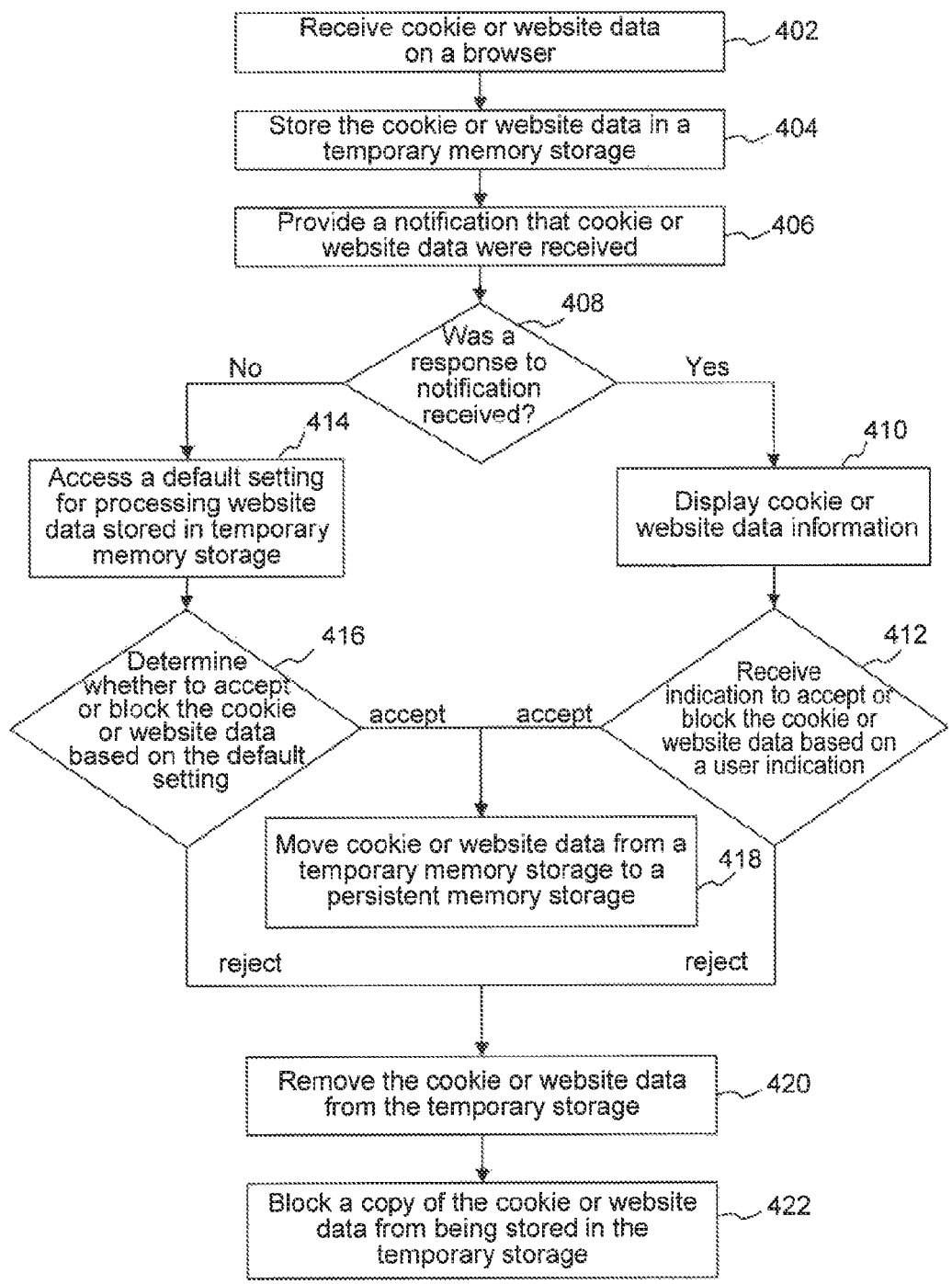
FIG. 4 is a flowchart of a method for delaying storage of a cookie or website data in a persistent memory storage, according to an embodiment.

FIG. 4 is a flowchart of a method 400 for delaying the storage of a cookie or website data in persistent memory storage, according to an embodiment.

At stage 402, a cookie or website data is received. For example, client 106 sends a request message for webpage 109 to web server 104. In response to the request message, browser 114 executing on client 106 receives a response message that includes cookie or website data 110C. A person skilled in the art will appreciate that the response message may include either cookie, scripts that access, rely on and/or manipulate website data, values for website data, or any of the above.

At stage 404, a cookie or website data are stored in a temporary memory. For example, browser 114 stores cookie or website data 110C received in stage 402 in temporary memory storage 206.

At stage 406, a notification message is displayed. For example, notification generator 208 issues a notification message to browser 114 that notifies a user that cookie or website data 110C are stored in temporary storage 206. The issued notification message is displayed on client 106 using, for example, a notification icon. When activated, the notification icon displays cookie or website data information to a user. As described herein, other types of notification may also occur on client 106.

At stage 408, a determination is made as to whether a response to a notification was received. For example, browser 114 determines whether the notification icon was activated, or a notification response was received from a user. When a response to a notification is received, the flowchart proceeds to stage 410. Otherwise, the flowchart proceeds to stage 416.

At stage 410, cookie or website data information is displayed. For example, client 106 displays a display screen, such as the one in FIG. 3, with cookie or website data information. The cookie or website data information includes information about cookie or website data 110C received in stage 402. Based on the displayed cookie or website data information, a user determines whether to accept or block cookie or website data 110C.

At stage 412, a determination to accept or block a cookie or website data is received. For example, browser 114 may receive an indication from a user to remove cookie or website data 110C from client 106. When browser 114 receives an indication from a user to accept cookie or website data 110C, the flowchart proceeds to stage 418. When browser 114 receives an indication from a user to block cookie or website data 1100, the flowchart proceeds to stage 420.

When a notification icon is not activated, the flowchart proceeds to stage 414. At stage 414, default settings for processing a cookie or website data are accessed. For example, browser 114 accesses default settings that include rules for processing cookie or website data 110C. As described herein, the default settings include rules for accepting or blocking cookie or website data 110C.

At stage 416, a determination is made on whether to accept or block a cookie or website data based on the default setting. When a rule in default settings accessed by browser 114 indicate that cookie or website data 110C may be stored in persistent memory storage 212, cookie or website data 110C is deemed accepted and the flowchart proceeds to stage 418. When browser settings indicate that cookie or website data 110C may not be stored in persistent memory storage 212, the flowchart proceeds to stage 420.

At stage 418, cookies are stored in persistent memory storage. When cookie or website data 110C is deemed accepted in stages 412 and 416, cookie or website data 110C is moved to persistent memory storage 212. In an embodiment, transferring module 210 moves cookie or website data 110C from temporary memory storage 206 to persistent memory storage 212. In persistent memory storage, cookie or website data 110C are combined with cookie or website data 110B, respectively, which are stored in persistent memory storage 212 on client 106.

At stage 420, cookie or website data 110C are removed from temporary memory storage. When cookie or website data 110C is deemed blocked from client 106 in stages 412 and 416, cookie or website data 110C is removed from client 106. For example, transferring module 210 removes cookie or website data 110C from temporary memory storage 206.

At stage 422, the removed cookie or website data is blocked. For example, cookie or website data 110C that is subsequently received on client 106 is blocked from being stored in temporary memory storage 206. For example, a setting within browser 114 may be set to subsequently block cookie or website data 110C.

Exemplary Computer System

Figure 5:
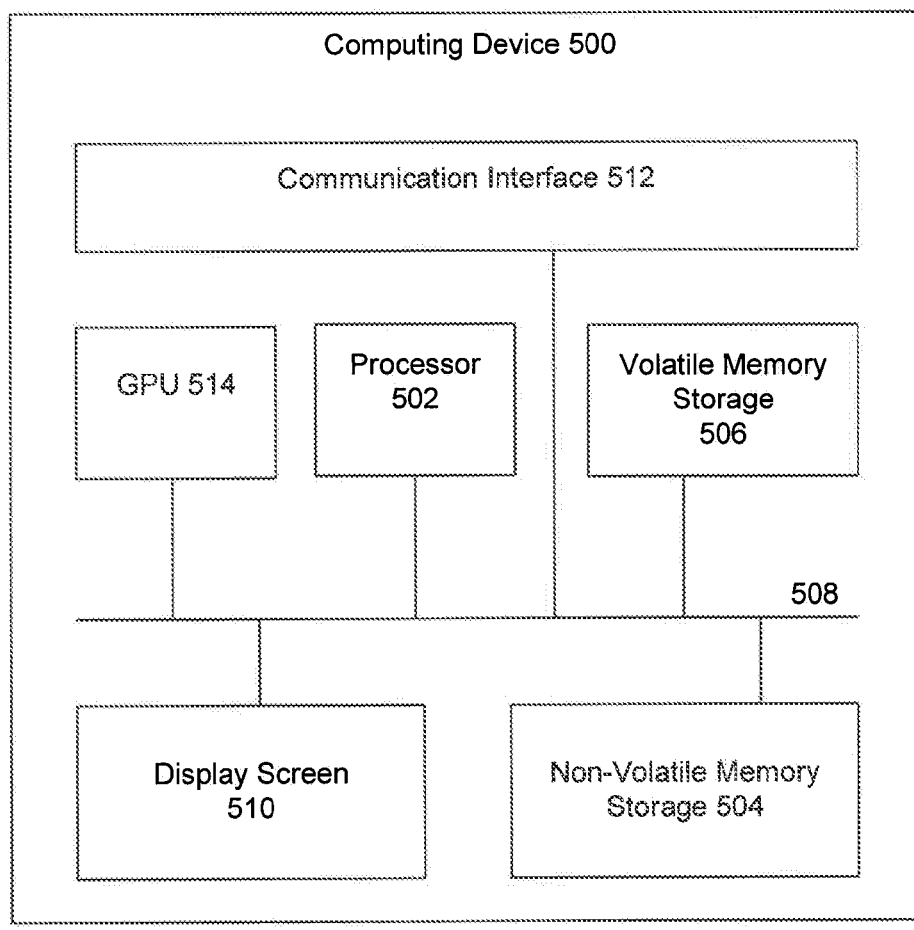
FIG. 5 is a block diagram of a computer system in which embodiments of the invention can be implemented.

FIG. 5 is an example computer system 500 in which embodiments of the present invention, or portions thereof, may be implemented as computer-readable code. For example, the components or modules of system 100, such as browser 114, data processor 204, notification generator 208, transferring module 210, etc., may be implemented in one or more computer systems 500 using hardware, software, firmware, tangible computer-readable media having instructions stored thereon, or a combination thereof and may be implemented in one or more computer systems or other processing systems. Modules and components in FIGS. 1-4 may be embodied in hardware, software, or any combination thereof.

Client 106 or web server 104 may include one or more computing devices. Client 106 or web server 104 may include one or more processors 502, one or more non-volatile storage mediums 504, one or more memory devices 506, a communication infrastructure 508, a display screen 510 and a communication interface 512.

Processors 502 may include any conventional or special purpose processor, including, but not limited to, digital signal processor ("DSP"), field programmable gate array ("FPGA"), and application specific integrated circuit ("ASIC").

GPU 514 is a specialized processor that executes instructions and programs, selected for complex graphics and mathematical operations, in parallel.

Non-volatile storage 504 may include one or more of a hard disk drive, flash memory, and like devices that may store computer program instructions and data on computer-readable media. One or more of non-volatile storage device 504 may be a removable storage device.

Memory devices 506 may include one or more volatile memory devices such as, but not limited to, random access memory. Communication infrastructure 508 may include one or more device interconnection buses such as Ethernet, Peripheral Component Interconnect ("PCI"), and the like.

Typically, computer instructions are executed using one or more processors 502 and can be stored in non-volatile storage medium 504 or memory devices 506.

Display screen 510 allows results of the computer operations to be displayed to a user or an application developer.

Communication interface 512 allows software and data to be transferred between computer system 500 and external devices. Communication interface 512 may include a modem, a network interface (such as an Ethernet card), a communications port, a PCMCIA slot and card, or the like. Software and data transferred via communication interface 512 may be in the form of signals, which may be electronic, electromagnetic, optical, or other signals capable of being received by communication interface 512. These signals may be provided to communication interface 512 via a communications path. The communications path carries signals and may be implemented using wire or cable, fiber optics, a phone line, a cellular phone link, an RF link or other communications channels.

Embodiments also may be directed to computer program products comprising software stored on any computer-readable medium. Such software, when executed in one or more data processing device, causes a data processing device(s) to operate as described herein. Embodiments of the invention employ any computer-readable medium. Examples of computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying, knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method, comprising:
storing data received from a web server in a temporary memory storage associated with a browser, including combining the stored data with instructions that access website data stored in a persistent memory storage on a client device;
generating a notification message upon storing the received data in the temporary memory storage, wherein the notification message indicates that the data is stored in the temporary memory storage;
outputting data information on the client device based on the generated notification message, the data information including information about functionality of the instructions and data when executed on the client device;
receiving an indication for processing the stored data based on the outputted data information;
determining when the indication was received within a configurable time interval, wherein the configurable time interval begins to accumulate when the notification message is received;
determining based on rules that are configurable to process data from a particular web server whether to transfer the stored data from the temporary memory storage to the persistent memory storage when the indication was not received within the configurable time interval; and processing the instructions and stored data based on the received indication.

2. The computer-implemented method of claim 1, wherein the combination of the instructions and data received from the web server at least access, manipulate or rely on the website data stored in the persistent memory storage.

3. The computer-implemented method of claim 1, wherein the website data is included in at least one of a document object model (DOM), a web database, an indexed database, an application cache or a file system on the client device.

4. The computer-implemented method of claim 1, wherein the processing further comprises:
    transferring the stored data from the temporary memory storage; and
    combining the stored data with the instructions to manipulate the website data in the persistent memory storage.

5. The computer-implemented method of claim 1, wherein the processing further comprises:
    removing the stored data from the temporary memory storage.

6. The computer-implemented method of claim 1, wherein the processing further comprises:
    blocking a subsequent copy of the stored data from being stored in the temporary memory storage of the client device, when the client device receives a subsequent copy of the stored data.

7. A client device, comprising:
    a persistent memory storage comprising instructions; and
    a data processor configured to:
        store data received from a web server in a temporary memory storage associated with a browser, including combining the stored data with the instructions that access website data stored in the persistent memory storage on the client device;
        generate a notification message upon storage of the received data in the temporary memory storage, wherein the notification message indicates that the data is stored in the temporary memory storage;
        output data information on the client device based on the generated notification message, the data information including information about functionality of the instructions and data when executed on the client device;
        receive an indication for processing the stored data based on the outputted data information;
        determine when the indication was received within a configurable time interval, wherein the configurable time interval begins to accumulate when the notification message is received;
        determine based on rules that are configurable to process data from a particular web server whether to transfer the stored data from the temporary memory storage to the persistent memory storage when the indication was not received within the configurable time interval; and
        process the instructions and stored data based on the received indication.

8. The client device of claim 7, wherein the combination of the instructions and data received from the web server at least access, manipulate or rely on the website data stored in the persistent memory storage.

9. The client device of claim 7, wherein the website data is included in at least one of a document object model (DOM), a web database, an indexed database, an application cache or a file system on the client device.

10. The client device of claim 7, further comprising a transferring module configured to:
    transfer the stored data from the temporary memory storage; and
    combine the stored data with the instructions to manipulate the website data in the persistent memory storage.

11. The client device of claim 7, wherein the transferring module is further configured to remove the stored data from the temporary memory storage.

12. The client device of claim 7, wherein the transferring module is further configured to block a subsequent copy of the stored data from being stored in the temporary memory storage of the client device, when the client device receives a subsequent copy of the stored data.

13. An article of manufacture including a non-transitory computer-readable storage medium having instructions stored thereon that, when executed by a computing device, cause the computing device to perform operations for delaying storage of data, the operations comprising:
    storing data received from a web server in a temporary memory storage associated with a browser, stored data is combined with instructions that access website data stored in a persistent memory storage on a client device;
    generating a notification message upon storing the received data in the temporary memory storage, wherein the notification message indicates that the data is stored in the temporary memory storage;
    outputting data information on the client device based on the generated notification message, the data information including information about functionality of the instructions and data when executed on the client device;
    receiving an indication for processing the stored data based on the outputted data information;
    determining when the indication was received within a configurable time interval, wherein the configurable time interval begins to accumulate when the notification message is received;
    determining based on rules that are configurable to process data from a particular web server whether to transfer the stored data from the temporary memory storage to the persistent memory storage when the indication was not received within the configurable time interval; and
    processing the instructions and stored data based on the received indication.

14. The article of manufacture of claim 13, wherein the combination of the instructions and data received from the web server at least access, manipulate or rely on the website data stored in the persistent memory storage.

15. The article of manufacture of claim 13, wherein the website data is included in at least one of a document object model (DOM), a web database, an indexed database, an application cache or a file system on the client device.

16. The article of manufacture of claim 13, wherein the instructions that process the data further include instructions that perform operations comprising:
    transferring the stored data from the temporary memory storage; and
    combining the stored data with the instructions to manipulate the website data in the persistent memory storage.

17. The article of manufacture of claim 13, wherein the instructions that process the data further include instructions that perform operations comprising:
    removing the stored data from the temporary memory storage.

18. The article of manufacture of claim 13, wherein the instructions that process the cookie further include instructions to perform operations comprising:
    blocking a subsequent copy of the stored data from being stored in the temporary memory storage of the client device, when the client device receives a subsequent copy of the stored data.

19. A computer-implemented method, comprising:
    storing a cookie received from a web server in a temporary memory storage associated with a browser, including combining the stored cookie with instructions that access website data stored in a persistent memory storage on a client device, before the cookie is stored in the persistent memory storage on the client device;

generating a notification message upon storing the received cookie in the temporary memory storage, wherein the notification message indicates that the cookie is stored in the temporary memory storage;

outputting data information on the client based on the generated notification message the data information including functionality of the cookie;

receiving an indication for processing the stored cookie based on the outputted data information;

determining when the indication was received within a configurable time interval, wherein the configurable time interval begins to accumulate when the notification message is received;

determining based on rules that are configurable to process data from a particular web server whether to transfer the stored cookie from the temporary memory storage to the persistent memory storage when the indication was not received within the configurable time interval; and processing the instructions and stored cookie based on the received indication.

20. A client device, comprising:

a persistent memory storage comprising instructions; and a data processor configured to:

store a cookie received from a web server in a temporary memory storage associated with a browser, including combining the stored cookie with the instructions that access website data stored in the persistent memory storage on the client device, before the cookie is stored in the persistent memory storage on the client device;

generate a notification message upon storage of the received cookie in the temporary memory storage, wherein the notification message indicates that the cookie is stored in the temporary memory storage;

output data information on the client based on the generated notification message the data information including functionality of the cookie;

receive an indication for processing the stored cookie based on the outputted data information;

determine when the indication was received within a configurable time interval, wherein the configurable time interval begins to accumulate when the notification message is received;

determine based on rules that are configurable to process data from a particular web server whether to transfer the stored cookie from the temporary memory storage to the persistent memory storage when the indication was not received within the configurable time interval; and process the instructions and stored cookie based on the received indication.

* * * * *